United States Patent [19]

Grevich

[11] 4,362,593
[45] Dec. 7, 1982

[54] WALKING-BEAM BAND SEALER

[75] Inventor: John J. Grevich, Star Prairie, Wis.

[73] Assignee: Nordson Corporation, Amherst, Ohio

[21] Appl. No.: 207,148

[22] Filed: Nov. 17, 1980

[51] Int. Cl.³ ............................................. B30B 15/34
[52] U.S. Cl. .............................. 156/498; 156/583.5; 156/574; 100/154; 100/93 R
[58] Field of Search ................ 156/308.4, 583.5, 498, 156/574, 583.4, 583.1, 583.8; 100/93 R, 151, 154; 53/477, 453

[56] References Cited

U.S. PATENT DOCUMENTS

| | | | |
|---|---|---|---|
| 3,258,385 | 6/1966 | Lake | 156/583.4 X |
| 3,692,608 | 9/1972 | Risgaard | 156/583.5 X |
| 4,080,241 | 3/1978 | Grevich et al. | 156/498 |
| 4,193,342 | 3/1980 | Held | 156/583.5 X |

FOREIGN PATENT DOCUMENTS 1343344 1/1974 United Kingdom .
1582777 1/1981 United Kingdom .

Primary Examiner—George F. Lesmes
Assistant Examiner—Alexander S. Thomas
Attorney, Agent, or Firm—Orrin M. Haugen; Thomas J. Nikolai

[57] ABSTRACT

A machine for sealing polyethylene bags or the like of the type having conveyer bands for gripping and transporting the bags to be sealed at a constant velocity from the machine's inlet end, through a heating station, then through a cooling station to the machine's outlet end. The conveyer bands are formed from a material having good release (non-stick) characteristics with respect to the fused thermoplastic. Disposed at the heating and cooling stations, respectively, are heating and chilling bars (heat transfer bars), each being disposed in pairs on opposite sides on and in proximity to the conveyer bands. Means are provided for cyclically opening and closing both pairs of bars relative to the conveyer bands and for translating the bars longitudinally in reciprocating fashion with respect to the moving bands. As bags to be sealed are carried along by the conveyor bands, the heat transfer bars pinch closed on the traveling bands, but since the bars at this time are being translated in the same direction of travel (forward stroke) and at the same velocity as the bands, no band wear occurs. Toward the end of this forward stroke, the heat transfer bars open relative to the bands and the return stroke occurs with substantially zero force between the moving bands and the heat transfer bars. During the return stroke, the bars act as a preheat device to warm up the film prior to the forward stroke to obtain greater speed. Because the bars are of a predetermined greater length than the length of the reciprocating stroke, a continuous package seal is ensured.

9 Claims, 13 Drawing Figures

WALKING-BEAM BAND SEALER

BACKGROUND OF THE INVENTION

I. Field of the Invention

This invention relates generally to packaging machinery and more specifically to an improved band sealer-type thermal plastic bonding machine for sealing polyethylene film bags or the like where the heating bars and chilling bars utilized therein are laterally and longitudinally movable in a reciprocatory manner relative to the conveyor bands such that greater dwell time for a given machine length can be obtained.

II. Discussion of the Prior Art

In my earlier U.S. Pat. No. 4,080,241 there is described a band sealer for sealing bags formed from thermoplastic films over which the present invention is deemed to be an improvement. As is set forth in that patent, a band-type sealer comprises a framework defining a longitudinal track and first and second endless belts or chains arranged to be driven in opposite directions to one another so that a bag to be sealed inserted at the machine's inlet end of the track is pinched between the conveyor bands and transported through the machine to a discharge point. Disposed between the inlet and the discharge are heating and cooling stations. Additional sets of endless bands are associated with the heating and cooling stations and disposed on opposite sides of the bands along the path of travel of the bag to be sealed are pairs of heating bars and chilling bars, respectively. The heating bars and chilling bars are arranged to abut the moving bands so as to apply heating or cooling, as the case may be, to the zone of the bag to be sealed as it is translated through the heating and cooling stations by the gripping action of the conveyor and sealing bands.

While the invention described in U.S. Pat. No. 4,080,241 constituted a marked improvement over the known prior art at that time in that it reduced considerably the wear and tear on sealing bands due to thermal stress, a certain amount of wear is occasioned by the rubbing contact between the heating and cooling bars and the bands associated therewith.

It has been the practice in the prior art to utilize thin, stainless steel bands at the heating and cooling stations, the bands being coated with a TEFLON material to improve their "release" properties. To reduce the thermal mass of the bands, it has been the practice to fabricate them from relatively thin strips. Repeated heating and cooling of the bands results in stresses tending to weaken them and also tending to distort the bands in such a fashion that they become rippled or corrugated. As such, there is a need for frequent adjustment of the heat transfer bars relative to the bands which, of course, results in machine down-time.

Band sealing machines of the prior art have also utilized TEFLON cloth bands. While they tend to convey heat readily and in a fashion superior to that obtainable with stainless steel bands while providing good release characteristics, such bands do not hold up well when rubbed across the face of the heating and cooling bars.

SUMMARY OF THE INVENTION

Band sealing machines made in accordance with the present invention obviate most of the foregoing problems encountered in prior art band sealers. This is accomplished through the use of a walking-beam carriage assembly which supports the heating and cooling (heat transfer) bars on either side of the bag transporting bands and allows reciprocal movement of the heat transfer bars as the bands move at a constant velocity in one direction from the machine's inlet end to its discharge end. At the first part of its stroke, the heating and cooling bars are open and do not positively pinch or squeeze the traveling bands, but instead exert a very slight contact on the bands to allow a preheat of the film. As the walking-beam conveyor starts its forward stroke from the inlet end toward the discharge end, the heat transfer bars are pinched closed on the bands traveling between them, but only after the relative velocity between the bands and the bars is zero. That is to say, when the carriage is moving the bars at the same velocity as the bands, the heat transfer bars are allowed to pinch tightly against the bands, allowing superior heat transfer through the thickness dimension of the bands to the thermal plastic bags gripped between the bands. As the walking-beam carriage nears the end of its forward stroke, the bars again open so as to no longer positively pinch the bands. Following this, the return stroke takes place in which the carriage is returned to its initial position toward the inlet end of the machine, the bars being in their open orientation during the entire return stroke.

Because of the walking-beam carriage mechanism, there is no significant rubbing contact between the heat transfer bars and the moving bands. Hence, the bands may be fabricated from TEFLON cloth which, as mentioned, is a preferred material because of its non-warping thermal properties and non-stick characteristics as compared to thin steel bands.

Band sealing machines using the walking-beam principle of the present invention also allow a somewhat greater sealing rate measured in inches per second than can be attained with prior art band sealers of a comparable length having stationary heat transfer bars. The chief reason for this is that TEFLON coated fiberglass bands have a limit to the temperature to which they may be exposed without resulting in their destruction. Typically, the upper limit to which such bands may be subjected is about 550° F. Thus, it is not possible to increase the production rate by merely raising the temperature of the heater bars employed and correspondingly increasing the transit speed of the bags past the heater bars. With the walking-beam band sealer of the present invention, however, the product remains engaged with the heating and cooling bars as the bags to be sealed are carried through the machine. In addition, and as mentioned earlier, the heat transfer bars are physically squeezed against the bands, allowing improved heat transfer through them to the film bags being sealed. Because of this, lower heater bar temperatures may be utilized. Moreover, the overall length of the machine can be reduced in that the time that the film material must be subjected to heat in order to achieve proper sealing is not totally a function of the length of the heated surface, but instead, is directly related to the speed with which the product is carried by the bands through the machine.

In the Risgaard U.S. Pat. No. 3,692,608 there is disclosed a sealing machine in which the heating and cooling bars are moved in a linear, oscillating fashion back and forth along the path of travel of a horizontal belt supporting a tubular film which is to be sealed and severed along a direction transverse to the direction of belt travel. In the Risgaard machine, the film to be sealed is indexed, step-by-step, and the distance between the heating bar and cooling bar corresponds to the seal-to-seal distance between adjacent segments. Thus, it is not a band sealer and differs markedly from the machine of the present invention which allows the bags to be sealed to continually move at a constant velocity from the inlet point of the machine to its discharge point.

OBJECTS

It is accordingly the principal object of the present invention to provide a new and improved band sealer for a packaging machine which results in superior seals and less machine down-time.

Another object of the invention is to provide an improved band sealer for a packaging machine wherein the heat transfer bars are mounted on a carriage for reciprocal motion back-and-forth along the path of travel of the sealing bands.

Still another object of the invention is to provide a band sealer for a packaging machine which substantially removes all wear due to friction between the sealing bands and the associated heat transfer bars.

A yet further object of the invention is to provide a walking-beam band sealer for a packaging machine wherein both the heating and cooling bars are arranged to pinch the bag transporting bands while traveling at the same speed as the bands during the heat sealing process and to spread to provide a predetermined clearance between the heat transfer bars and the sealing bands during the return stroke of the walking-beam carriage.

Yet another object of the invention is to provide a walking-beam band sealer for a polyethylene bag sealing machine wherein during a forward stroke the bands are positively gripped by the heat transfer bars to provide sufficient heat to cause fusion of the bag material in the sealing zone, but released during the return stroke to a degree such that little or no wear occurs but that preheating of the bag material is achieved.

A yet still further object and advantage of the invention is that the walking-beam arrangement facilitates the use of TEFLON cloth bands in the sealer.

These and other objects and advantages of the invention will become apparent to those skilled in the art from the following detailed description of a preferred embodiment when considered in conjunction with the accompanying drawings in which like numerals in the several views refer to corresponding parts.

DESCRIPTION OF THE PREFERRED EMBODIMENT

Figure 1A:
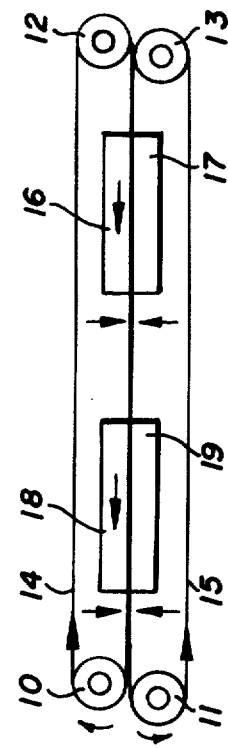
FIG. 1A is a schematic top view drawing showing the relative positioning of the heat transfer bars relative to the moving bands during the initial stage of travel of the bars from their extreme rearward (inlet) position towards the machine's forward (discharge) position.

Before describing the details of the construction of the preferred embodiment, it is deemed expedient at the outset to first explain with the aid of the schematic diagrams of FIGS. 1 through 4 the sequencing of the heat transfer bars as bags to be sealed are transported through the machine. Referring to FIG. 1A, a pair of driving wheels 10 and 11 are provided at the forward or discharge end of the machine and a pair of idler wheels 12 and 13 are journaled for rotation at the inlet or rearward end of the machine. A first continuous band 14 is looped about the drive wheel 10 and its associated idler wheel 12 and a second continuous band 15 encircles the drive wheel 11 and its associated idler wheel 13. In operation, the drive wheels 10 and 11 are driven in opposite directions and are so spaced relative to one another and to their associated idler wheels that the flights of the bands 14 and 15 juxtaposed in close proximity to one another travel in the same direction and at the same constant speed. The open end of the bag to be sealed is fed between the idler wheels 12 and 13 and is gripped between the two traveling bands 14 and 15 as it is carried to the left, as illustrated in FIG. 1A, towards the discharge end of the machine.

Identified by numerals 16 and 17 are heating bars which are disposed on opposite sides of the center flights of the bands 14 and 15. Numerals 18 and 19 identify a corresponding set of chilling bars which are likewise positioned on opposite sides of the center flights of the bands 14 and 15. The heating and chilling bars are spoken of collectively herein as "heat transfer bars." As will be seen, as the bags enter the machine, they are "walked" through the sealer by a linear oscillating movement of the heat transfer bars, whilee the bands, preferably made from TEFLON treated fiberglass cloth, continue to move in the same direction at a constant speed.

Figures 1B, 2B:
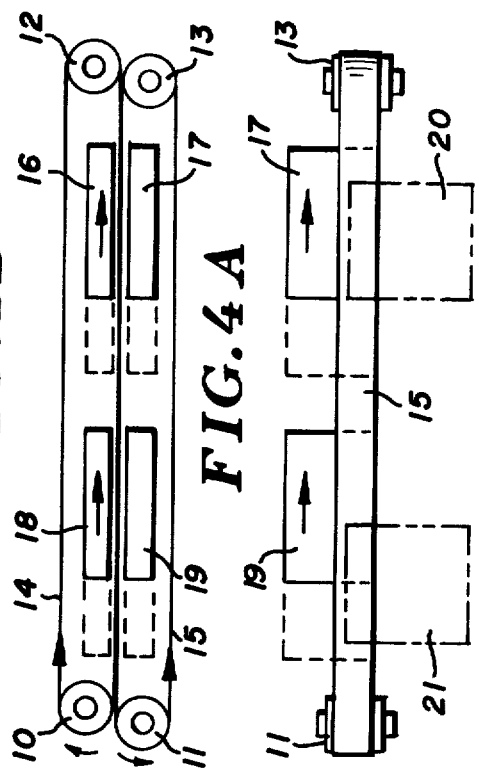
FIG. 1B is a side view of the arrangement of FIG. 1A.
FIG. 2B is a side view of the arrangement shown in FIG. 2A.

In FIG. 1A, the heat transfer bars 16–17 and 18–19 are shown as being open or spaced from the center flights of the bands. This is the condition of the heat transfer bars at the moment that the bars begin their forward travel from the righthand or inlet end of the machine to the lefthand or discharge end. FIG. 1B is a side elevation of the schematic arrangement shown in FIG. 1A with a series of film bags to be sealed illustrated by ghostline rectangles and identified by numerals 20 and 21, respectively.

Figure 2A:
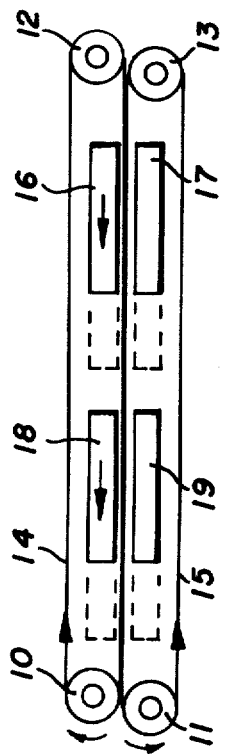
FIG. 2A is a schematic top view showing the positioning of the heat transfer bars relative to the moving bands during the major portion of the forward stroke.

Next, with reference to FIGS. 2A and 2B, when the heat transfer bars begins to move in their forward direction (as indicated by the arrows on the bars) and reach the same velocity as the moving bands, the heat transfer bars are pinched together, squeezing the bands as well as the bag to be sealed which is disposed between the bands. Because the heat transfer bars and the bands are moving at the same relative velocity at the time that the bars are pinched together, there is no rubbing or scuffing of the bands against the surfaces of the heat transfer bars.

Figure 3A:
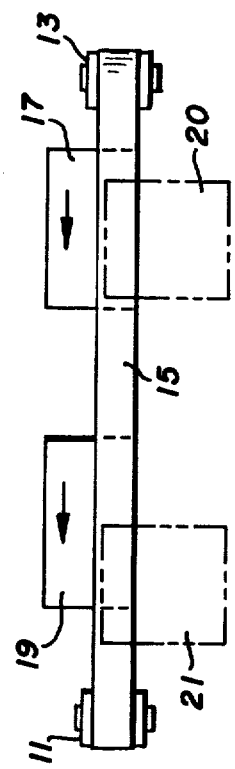
FIG. 3A illustrates by means of a schematic top view the relative positioning of the heat transfer bars with respect to the moving bands just prior to their reaching the forwardmost end of their stroke.
Figures 3B, 4B:
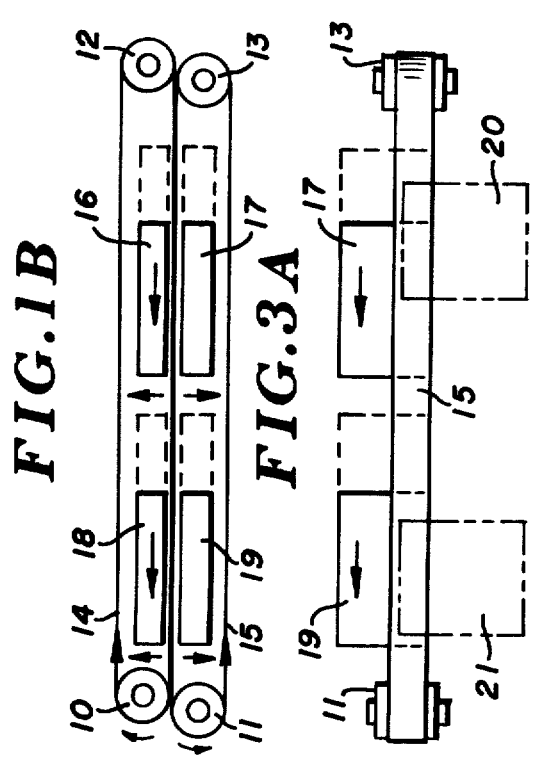
FIG. 3B is a side view of the arrangement shown in FIG. 3A.
FIG. 4B is a side view of the arrangement shown in FIG. 4A.

With reference now to FIGS. 3A and 3B, these drawings illustrate the relative positioning of the heat transfer bars relative to the center span of the belts 14 and 15 immediately prior to the end of the forward motion of the heat transfer bars. In that the carriage supporting the heat transfer bars is made to move in reciprocating fashion, it is necessary that the heat transfer bars separate so as to no longer grip the center span of the belts prior to deceleration of the heat transfer bars at the end of their stroke. Thus, as viewed in FIGS. 3A and 3B, the carriage is nearing the end of its stroke and the bars have separated at the onset of the deceleration phase.

Figure 4A:
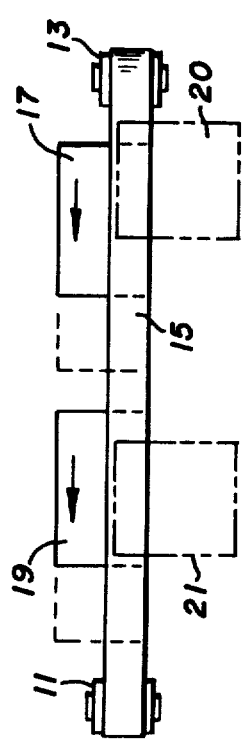
FIG. 4A is a schematic top view of the apparatus showing the relative positioning of the heat transfer bars with respect to the moving bands during the rearward or return stroke of the heat transfer bars.

FIGS. 4A and 4B show the lateral positioning of the heat transfer bars relative to the central flight of the bands 14 and 15 during the return stroke of the carriage from the discharge end of the machine towards its inlet end, thus completing the cycling sequence.

It can be seen, then, in the walking-beam band sealer of the present invention in their forward stroke the heat transfer bars are made to travel at the same speed as the TEFLON cloth bands used to transport the bag to be sealed and during the heat sealing process, the bars and bands to not rub against one another, but move at the same relative speed. Toward the end of the stroke, the heating bars and cooling bars open up relative to the bands prior to deceleration and the return cycle. The degree of opening or separation between mating bars is quite small, sufficient to remove the pressure from the bands, but still sufficient to maintain a desired degree of thermal contact between the heater bars and the TEFLON bands so that the film which is now traveling in a direction opposite to the direction of travel of the heat bars will be preheated. The degree of contact, however, is so slight that there is practically zero wear or friction applied to the TEFLON bands, thus increasing their useful life. Also, as a result of the preheating phase during the return stroke of the heat transfer bars, more heating time of the bag top is obtained than can be obtained with conventional, prior art band sealers in which the heater bars remain stationary relative to the frame of the machine while the bands continue to move by these stationary bars.

Now that the basic sequence of operation of the walking-beam band sealer of the present invention has been explained, consideration will next be given to the mechanical construction of the machine whereby the desired oscillatory motion and the clamping/unclamping of the heat transfer bars relative to the moving bands can be achieved.

Figure 5:
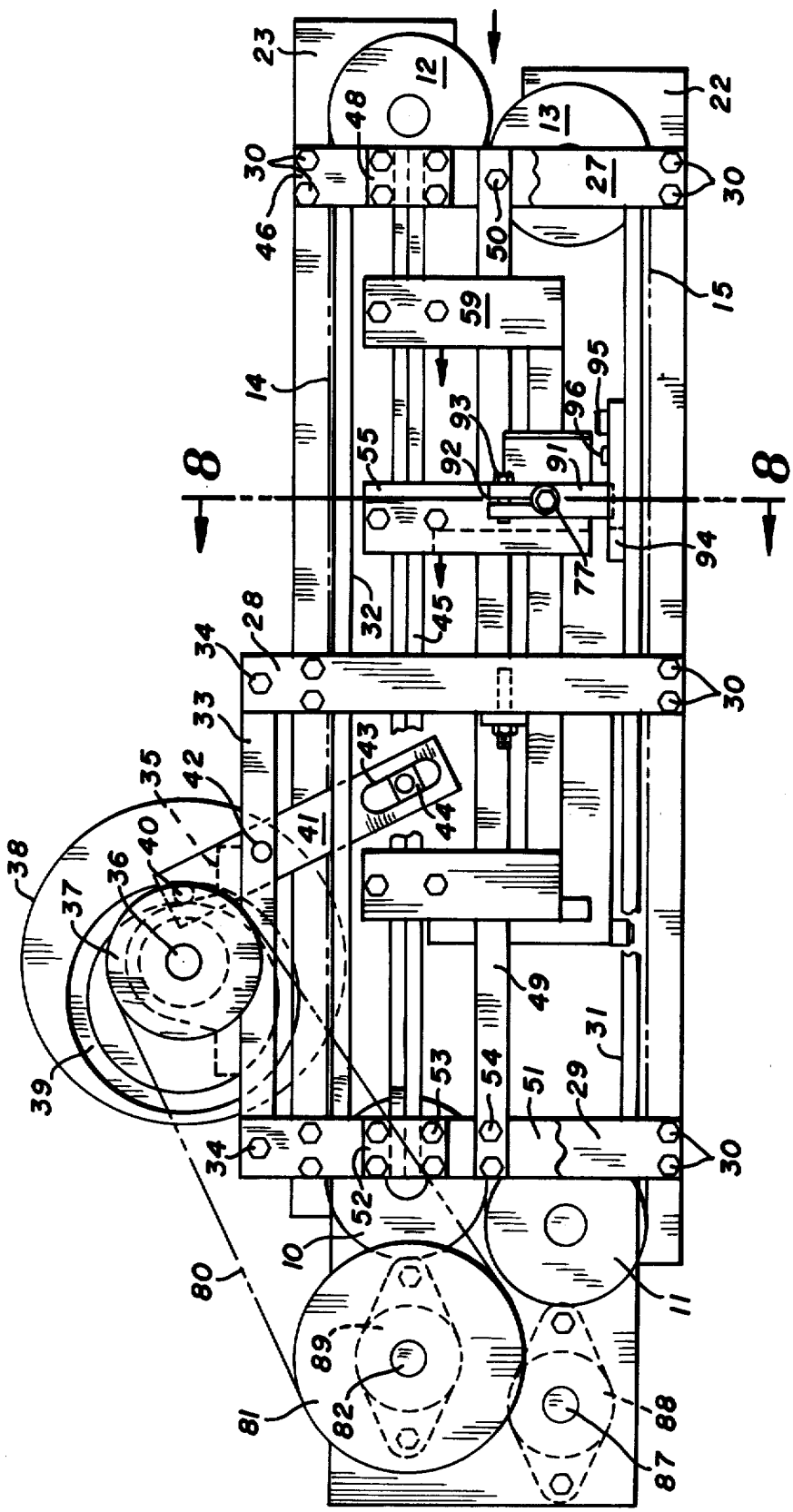
FIG. 5 is a plan view of the preferred embodiment of the invention at the beginning of the forward stroke of the walking-beam carriage.
Figure 6:
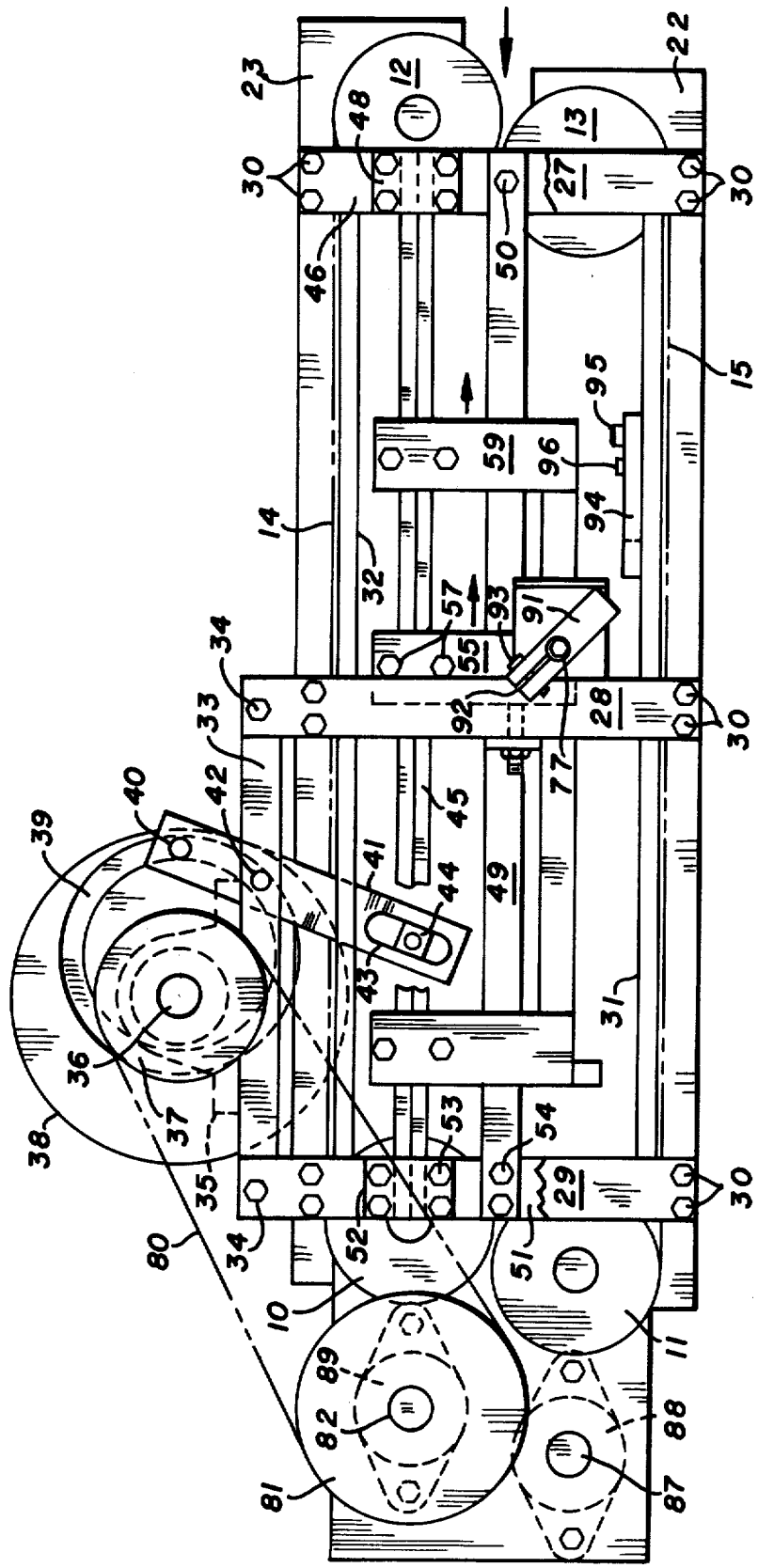
FIG. 6 is a top view of the preferred embodiment as the walking-beam carriage reaches its forwardmost position.
Figure 7:
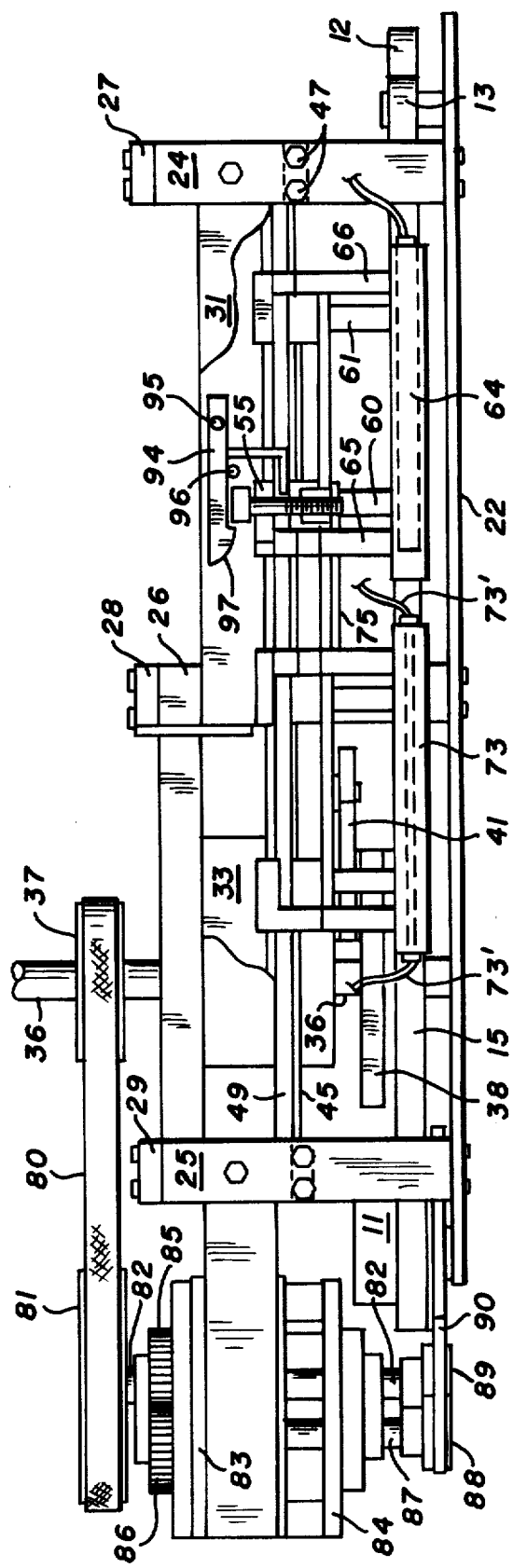
FIG. 7 is a side elevation of the preferred embodiment.

Referring first to FIGS. 5 and 7 of the drawings which respectively show a top and side elevation of the machine, the framework thereof comprises a pair of base plates 22 and 23 which are arranged to lie in the same plane but which are spaced apart from one another to define a longitudinal opening running generally centrally through the lengthwise dimension of the machine. Bolted to each of the base plates and extending vertically upward therefrom are support posts as at 24, 25 and 26, these posts being arranged in pairs across the width of the machine. Extending between each pair of vertical support posts are cross bars 27, 29 and 28, which are bolted to the upper edge surface of the vertical posts by bolts as at 30.

The idler wheels 12 and 13 are journaled for rotation about vertically extending axes at the rightmost or inlet ends of the base plates 23 and 22. The driving wheels 10 and 11 for the bands 14 and 15 are likewise journaled to the base plate and rotate about vertical shafts as is best illustrated in the plan view of FIG. 5. The manner in which drive power is applied to the band drive wheels 10 and 11 will be explained in greater detail hereinbelow.

Located on opposite sides of the walking-beam band sealer are first and second transversely extending side members 31 and 32. In FIG. 7, the side member 31 is broken away to reveal those further parts of the machine lying directly behind it. These side members provide added rigidity in that they are bolted to the vertical support members a predetermined distance above the point of attachment of those vertical supports to the base plates.

It can be noted from the plan view of FIG. 5 that the cross bars 28 and 29 extend a predetermined distance beyond the vertical support posts and bolted to the underside of the extensions of the cross bars 28 and 29 is a mounting plate 33, the mounting plate being held in place by the bolts as at 34. The mounting plate 33 extends vertically downward from the undersurface of the cross bars 28 and 29 and is fastened by bolts (not shown) to the outer vertical sides of the rear support posts 26. Bolted to the mounting plate 33 in a vertical alignment are first and second spaced apart bearing brackets as at 35, the brackets containing sleeve bearings which, in turn, support a vertical drive shaft 36. This shaft is arranged to be driven by an electric motor (not shown) and fastened to it is a notched pulley 37. Fastened proximate the lower end of the drive shaft 36 is a circular cam plate 38 in which is milled out or otherwise formed a cam groove 39. The cam groove 39 is arranged to cooperate with a follower roller 40 which is journaled for rotation on the undersurface of an actuator arm 41. The actuator arm is also pivotally connected by a suitable pin and bushing as at 42 to the underside edge of the mounting plate 33. The actuator arm 41 further includes an elongated slot 43 which is fitted over a rod having a rectangular cross-section, which rod is pinned for rotational movement to the carriage assembly yet to be described.

As the cam plate 38 is driven by the electric motor (not shown), the follower roller 40 will be made to traverse the cam profile 39 milled in the plate 38 and because of the manner in which the actuator arm 41 is pivotally mounted to the underside of the mounting plate 33, a reciprocating, back-and-forth motion will be applied to the carriage. By properly shaping the cam profile in accordance with well-known kinematics principles, it is possible to introduce a desired pattern of acceleration, constant velocity and deceleration to the carriage assembly.

Having generally described the framework of the machine, consideration will next be given to the details of the carriage assembly which supports the heat transfer bars during their reciprocal motion along the path of travel of the central span of the bands 14 and 15 as they carry the bags to be sealed through the machine. In this regard, the views of FIGS. 5, 7 and 8 will be referred to.

The carriage is arranged to ride along a guide bar 45 which runs substantially the full length of the machine. Specifically, the guide bar 45 has a generally rectangular cross-section, as can best be seen in the view of FIG. 8, and is clamped in position at the inlet end of the machine between an intermediate cross bar member 46, which generally underlies the upper cross bar 27 and is held in position between the opposed vertical posts as at 24 by means of bolts 47, and by an upper clamping plate 48 which is fastened to the intermediate cross bar 46 by clamping bolts as is illustrated. The carriage is further supported by a generally flat, elongated steel bar 49 which is bolted to the intermediate cross bar 46 by a bolt 50.

In a similar fashion, the forward ends of the guide bar 45 and the support bar 49 are clamped in position and held rigidly to a further intermediate cross bar 51 which underlies the upper cross bar 29 and extends between the vertical posts 25 at the forward end of the machine. Again, a clamping plate 52 which is notched to receive the edge of the guide bar 45 is bolted to the intermediate cross bar 51 as at 53 to hold the guide bar 45 in precise alignment with the central axis of the sealing machine. The support bar 49 is also fastened at its forward end to the intermediate cross bar 51 by means of bolts as at 54.

The carriage assembly is supported by the support bar 49 and is guided in its reciprocating motion by the guide bar 45. With reference to the cross-sectional view of FIG. 8, which is taken along the line 8—8 in FIG. 5, it can be seen that the forward portion of the carriage supporting the heating bars comprises upper and lower carriage plates 55 and 56 which are clamped together on opposite sides of the rectangular guide bar by means of bolts 57. Because the carriage plates 55 and 56 are designed to move longitudinally along the length of the guide bar 45, it has been found expedient to incorporate into the carriage plates a suitable bearing material as at 58. It is readily apparent that the amount of clamping force between the carriage plates and its associated guide bar is adjustable through the bolts 57. The upper carriage plate 55 is not positively clamped to the rectangular support bar 49, but merely rests upon it during its longitudinal travel. That is to say, the purpose of the support bar 49 is to relieve the cantilevered weight which would otherwise act upon the guide bar 45 and its use reduces the possibility of binding. The heater bar carriage assembly also includes an additional set of carriage plates disposed on either side of the guide rod 45 and support bar 49, only the rear upper carriage plate 59 being visible in the top view of FIG. 5.

Depending downwardly from the lower carriage plate 56 and fixedly attached thereto is a leg member 60. Similarly, a downwardly depending leg 61 is also fixedly attached to the lower rear carriage plate (unnumbered). Extending between the downwardly depending spaced apart legs 60 and 61 at an elevation generally corresponding to the elevation of the TEFLON bands 14 and 15 above the base plates 22 and 23 is the fixed heater bar 62. The heater bar, itself, comprises a generally rectangular member having a longitudinal bore 63 extending through it for receiving a conventional resistance heater cartridge 64 as shown in the view of FIG. 7.

Figure 8:
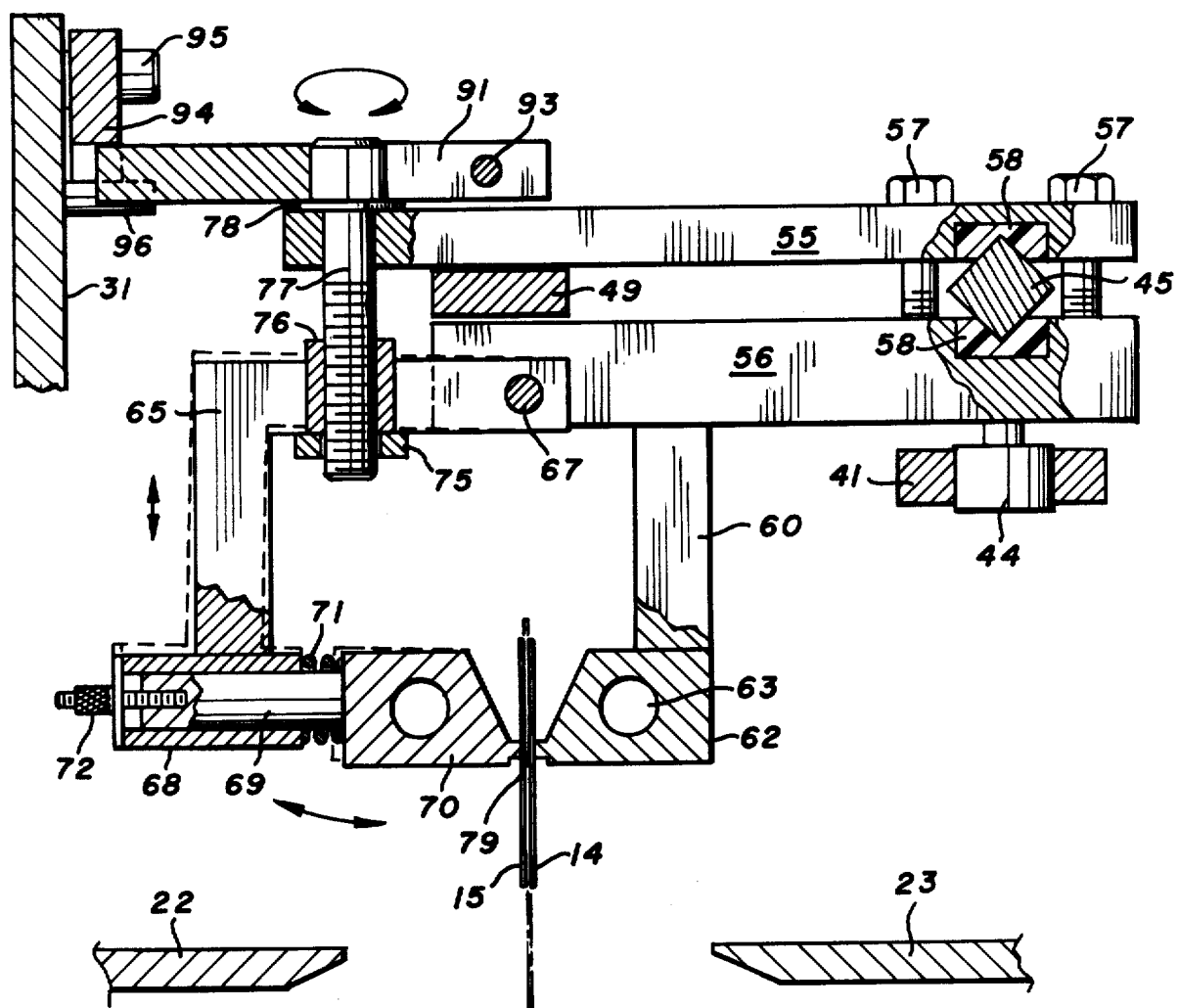
FIG. 8 is a sectional view taken along the lines 8—8 in FIG. 5.

Also coupled to the front and rear lower support plates, such as plate 56 in FIG. 8, are L-shaped movable heater bar support arms 65 and 66. These arms are pivotally secured as at 67 to the spaced apart lower carriage plates. Secured to the lower ends of the arms 65 and 66 are tubular sleeves as at 68 and fitted into the central opening of the tubular sleeve 68 is a mating projection 69 which extends outwardly from a side surface of the movable heater bar member 70. Disposed between the end of the sleeve 68 and the heater bar 70 is a spring 71 of the compression type which normally urges the movable heater bar 70 away from the side edge of the sleeve 68. An adjustment screw 72 which preferably has a clicker or ratchet or other type of vernier scale associated with it may be used to set the degree of extension of the movable heater bar 70 in a generally horizontal plane.

Also secured to the carriage member are chilling bars, only one of which, 73, is viewable in the side view of FIG. 7. The chilling bars may be fluid-cooled and in this case, flexible tubing as at 73' may be used to convey the cooling fluid through the bars. Because the manner in which the chilling bars are supported is substantially identical to the arrangement shown in the cross-sectional diagram of FIG. 8, it is deemed unnecessary to describe that support structure. Suffice it to say, a relatively fixed chilling bar is made to depend from a lower carriage support member so that its working face is in a close, but non-contact, relationship with the bands 14-15 and, further, that a mating, laterally movable chilling bar is also deployed on the opposite face of the sealing bands.

As is further illustrated in FIGS. 7 and 8, an elongated strap 75 is affixed to the underside of the generally horizontal portion of the L-shaped heater bar support arms 65 and 66 as well as the corresponding movable L-shaped arms associated with the chilling bars. An internally threaded bushing 76 fits through a bore formed through the generally horizontal portion of the L-shaped arm 65 and a bolt 77, which passes through a washer 78 and a hole formed through the upper carriage plate 55, is threaded into the bushing 76. It can be seen, then, that as the bolt 77 is rotated, it will cause the arm 65 to be swung about the pivot point 67. Rotation of the screw in a first direction will cause the sealing face 79 of the heater bar 70 to be displaced laterally away from the bands 14-15 while rotation in the opposite direction will move the face 79 toward these bands. In that the elongated strap 75 extends between both the movable heating bar support arms and the movable chilling bar support arms, these arms will be moved in unison.

To avoid scuffing of the bands as the heat transfer bars are brought into engagement therewith, it is necessary that the relative velocity between the heat transfer bars and the bands be zero. This is accomplished through proper synchronization of the driven cam 38 and the drive applied to the bands. The manner in which this synchronization is achieved will next be explained.

The pully 37 on the drive shaft 36 is of the toothed variety and a notched timing belt 80 engages that toothed wheel and extends to a similar tooth pulley 81 affixed to a shaft 82 which is journaled for rotation about a vertical axis, the shaft passing through mounting plates 83 and 84 which extend between the parallel, vertical side plates 31 and 32. Also affixed to the shaft 82 is a first gear 85 which meshes with an identical gear 86, the latter gear being fastened to a vertical shaft 87 which extends through the horizontal plates 83 and 84, as is best illustrated in the side view of FIG. 7. Affixed to the lower ends of the shafts 82 and 87 are notched wheels or pulleys 88 and 89. The pulley 88 has a notched timing belt 90 joining it to the band drive wheel 11 and, similarly, a notched belt (not shown) is joined between the toothed wheel 89 and the band drive wheel 10. By providing a belt drive between the pulleys 88 and 89 and the band drive wheels 10 and 11, replacement of the endless bands 14 and 15 is greatly facilitated.

When the shaft 36 is driven by an electric motor, either directly or through a belt or chain linkage, the cam 38 is rotated, as is the upper tooth pulley 81. Pulley 81 turns a shaft to which the gear 85 is attached and because that gear meshes with the gear 86, both of the shafts 82 and 87 will be driven at the same relative velocity. Likewise, the belt connection between the tooth wheels 88 and 89 and their associated band drive wheels 10 and 11 will ensure that the bands also move with the same velocity. In that the rotation of the cam 38 is thus synchronized with the rotation of the bands 14 and 15, by properly designing the profile defined by the groove 39 in the cam plate 38, the carriage assembly will be made to move reciprocally, back-and-forth, along the guide bar 45. Carriage acceleration and deceleration can be built into the cam profile.

Next to be explained will be the manner in which the heat transfer bars are opened and closed relative to the bands with which they cooperate at appropriate times during the stroke so that there will be no rubbing or scuffing of the bands between the movable heat transfer bars and the stationary bars which which they cooperate.

Referring to FIG. 5, it can be seen that there is secured to the head of the bolt 77 a bifurcated actuator arm 91. The arm comprises a generally rectangular bar having an aperture formed therethrough with a slot 92 extending from the aperture to the end edge of the arm. A clamping bolt 93 extends through the arm in a direction transverse to the slot and by tightening the bolt 93, the gripping force between the arm and the head of the bolt 77 is maintained.

A latch mechanism 94 is positioned adjacent the side rail member 31 of the frame and a smooth shouldered bolt 95 passes through a hole formed through the thickness dimension of the latch and into the side rail so as to serve as a pivot about which the latch 94 may rotate in a vertical plane. A stop pin 96 also extends through the side rail member 31 and is positioned so as to abut the bottom edge of the latch 94 to prevent rotation downwardly beyond the horizontal. As can best be seen in the side view of FIG. 7, the leading edge 97 of the latch 94 is smoothly curved and terminates in an abrupt shoulder to thereby define a latch barb.

The top view of FIG. 5 illustrates the orientation of the carriage at its transition from the rearward stroke to the forward stroke. At this moment, the arm 91 coupled to the lifting bolt 77 is normal to the direction of travel of the carriage and its leading edge is displaced rearwardly a short distance from the barb shoulder on the latch 94. Under the influence of the driving cam 38, the carriage is now assumed to be moving in its forward direction towards the discharge end of the machine and because of the manner in which the cam groove 39 is shaped, the carriage is undergoing acceleration. By the time that the leading edge of the actuator arm 91 contacts the barbed shoulder of the latch 94, the carriage will be moving at the same velocity as the center spans of the TEFLON cloth bands 14 and 15. As the carriage continues to move, the arm 91 is dragged past the barb on the latch 94 and is thereby rotated in a counterclockwise direction when viewed from the top as in FIG. 5. This counterclockwise rotation of the arm 91, in turn, rotates the bolt member 77 so as to cause the L-shaped heat transfer bar support arms to move the working face of the heat transfer bars in tight engagement with the moving bands. In that both the carriage and the bands are moving at the same velocity, there will be no frictional wear on the bands.

As the carriage nears the end of its forward stroke, the leading edge of the actuator arm abuts a stationary pin suspended from the cross bar 28, this pin being on the opposite side of the bolt 77 from the portion of the actuator arm 91 which coacts with the latch 94. Hence, as the cam reaches that portion of its profile where the carriage is made to decelerate prior to the onset of the return stroke, the arm 91 affixed to the bolt 77 is rotated in a clockwise direction which imparts a lifting action on the heat transfer bar support arms causing the heat transfer bars to be pivotally lifted away from their position of contact with the sealing bands 14 and 15. As such, the bands are no longer being squeezed by the heat transfer bars when the carriage begins its deceleration, again ensuring that there is no band wear due to friction.

During the return stroke of the carriage, then, the heat transfer bars are open relative to the bands and this condition prevails as the carriage moves to the rear. The rounded leading edge 97 of the latch will contact the actuator arm 91 during the return stroke and the latch will ride up as the actuator arm 91 passes thereunder until the actuator arm is rearward of the barb on the latch. The latch suddenly falls downward as the carriage continues to move to the very end of its rearward stroke. This completes the cycle, it being understood that during the next forward stroke, the interaction between the arm 91 and the latch 94 will again cause the heat transfer bars to be lowered by rotation of the bolt 77 until the bars are made to pinch the sealing bands at the appropriate point in the forward stroke of the machine, all as has already been described.

It can be seen, then, that as bags are fed into the machine for sealing, they are gripped between the sealing bands 14 and 15 which move at a constant velocity. As the bags move through the machine, the carriage assembly with its heat transfer bars is moved in a reciprocating fashion along the path of travel of the bands. During the motion of the carriage from the inlet end of the machine towards the discharge end, the heat transfer bars are made to pinch against the sides of the bands to cause improved thermal conduction either into or out of the thermoplastic film to be bonded, but only when the heat transfer bars are moving at the same velocity as the bands. During the return stroke of the carriage, the bands are open but a precise, predetermined gap is maintained between the heat transfer bars and the sealing bands passing therebetween so as to effect preheating of the film material during the return stroke.

It is to be further mentioned that the length dimension of the working face of the heat transfer bars is slightly larger than the carriage stroke. Accordingly, there will always be a degree of overlap between the heat transfer bars and the material to be sealed passing through the machine to ensure a continuous seal.

Figure 9:
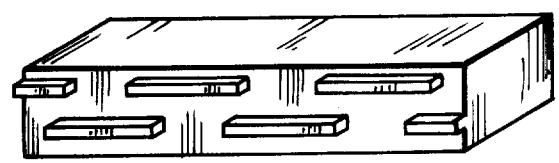
FIG. 9 illustrates a heat transfer bar usable with the present invention for forming a "maze seal."

Another advantage of the machine of the present invention not heretofore mentioned is that it may be used to create a so-called "maze seal" across the opening of a film bag passing through the machine. That is to say, the working faces of the stationary and moving heat transfer bars may be as depicted in FIG. 9 where, instead of having a continuous, straight-line sealing strip running the full length of the face of the heat transfer bar, the heat transfer bar may have two or more discontinuous, overlapped raised strips. A maze seal allows air entrapped in the bag during the sealing process to escape via a tortuous path while the product contained in the bag is of a size precluding it from flowing through the seal. In a conventional band sealer where the heat transfer bars are stationary and the bag to be sealed is drawn past then such a maze seal cannot be made. When the plastic bag to be sealed is dragged past the heat transfer bars it results in a plurality of continuous straight-line seals, irrespective of the pattern on the working face of the heat transfer bars. With a walking-beam band sealer of the type described herein, however, because the heat transfer bars move in unison with the product as it is made to traverse the machine, the use of heat transfer bars such as illustrated in FIG. 9 will result in seal lines having predetermined patterns.

The invention has been described herein in considerable detail, in order to comply with the Patent Statutes and to provide those skilled in the art with information needed to apply the novel principles, and to construct and use such specialized components as are required. However, it is to be understood that the invention can be carried out by specifically different equipment and devices, and that various modifications, both as to equipment details and operating procedures can be effected without departing from the scope of the invention itself.

What is claimed is:

1. Apparatus for sealing layers of thermoplastic film together, comprising:
   (a) conveyor means for transporting at least two juxtaposed layers of thermoplastic film along a first path from an inlet site to a discharge site;
   (b) motor means for causing continuous operation of said conveyor means in a first direction at a predetermined velocity;
   (c) sealing and cooling heat transfer members disposed in normally spaced relation proximate said conveyor means so that said film moves in the space between said members;
   (d) carriage means connected to said motor means for causing reciprocating motion of said heat transfer members along a second path aligned with said first path, said motion including a portion having the direction and velocity of said conveyor means;
   (e) a drive shaft driven by said motor means;
   (f) a cam affixed to said shaft for rotation therewith;
   (g) a cam followr arm coupling said cam to said carriage means; and
   (h) means on said carriage means for moving said heat transfer members reciprocally in a direction transverse to said first path at predetermined points in said reciprocating motion of said carriage member along said second path.

2. Apparatus as in claim 1 wherein said conveyor means comprises:
   (a) first and second flexible endless bands positioned in a side-by-side relationship such that corresponding flights of said bands move at the said velocity in close proximity to one another, whereby the layers of thermoplastic films, when inserted between said flights, are gripped thereby and carried by said bands from said inlet site to said discharge site.

3. Apparatus as in claim 2 and further including:
   (a) an elongted frame member;
   (b) a pair of driving wheels journaled for rotation at one end of said frame and a pair of driven wheels journaled for rotation at the opposite end of said frame, said first and second flexible endless bands being respectively coupled about one of said pair of driving wheels and one of said pair of driven wheels, said driving wheels being driven in opposite directions whereby adjacent flights of said first and second endless bands travel in the same direction and at the said speed.

4. Apparatus as in claim 2 wherein said first and second endless bands are formed from TEFLON treated fiberglass.

5. Apparatus as in claim 2 wherein said heat transfer members comprise:
   (a) first and second heated bars disposed on opposite sides of said adjacent flights of said first and second endless bands; and
   (b) first and second chilled bars disposed on opposite sides of said adjacent flights of said first and second endless bands, said chilled bars being coupled to said carriage more proximate to said discharge point than said heated bars.

6. Apparatus as in claim 5 wherein the individual lengths of said heated bars and said chilled bars is greater by a predetermined amount than the reciprocating stroke of said carriage.

7. Apparatus according to claim 1 in which the last named means includes screw threaded means reversably actuable to move said members together and apart and means located in said second path near the ends thereof for reversably actuating said screw threaded means.

8. Apparatus as in claim 1 wherein said heat transfer members have apposed surfaces configured to form a maze seal between said layers of film whereby to enable passage therebetween of air but not of solid material.

9. Apparatus as in claim 8 in which each of said apposed surfaces comprises a pair of laterally spaced linear patterns aligned with said path and comprising interrupted raised lines, the centers of the interruptions in one pattern being generally aligned laterally with the centers of the raised lines of the other pattern.

* * * * *